(12) United States Patent
Skarpil

(10) Patent No.: US 7,772,490 B2
(45) Date of Patent: Aug. 10, 2010

(54) ELECTRICAL DEVICE COMPRISING A CONNECTING CABLE AND METHOD FOR PRODUCING SAID DEVICE

(75) Inventor: Harry Skarpil, Dortmund (DE)

(73) Assignee: Siemens VDO Automotive AG, Regensburg (DE)

( * ) Notice: Subject to any disclaimer, the term of this patent is extended or adjusted under 35 U.S.C. 154(b) by 286 days.

(21) Appl. No.: 11/922,186

(22) PCT Filed: Jun. 13, 2006

(86) PCT No.: PCT/EP2006/063124

§ 371 (c)(1),
(2), (4) Date: Dec. 12, 2007

(87) PCT Pub. No.: WO2006/136510

PCT Pub. Date: Dec. 28, 2006

(65) Prior Publication Data
US 2008/0254679 A1 Oct. 16, 2008

(30) Foreign Application Priority Data
Jun. 23, 2005 (DE) .................. 10 2005 029 554

(51) Int. Cl.
H02G 15/08 (2006.01)
(52) U.S. Cl. ....................................... 174/93
(58) Field of Classification Search ............... 174/93, 174/DIG. 8
See application file for complete search history.

(56) References Cited
U.S. PATENT DOCUMENTS

| 3,297,819 | A | * | 1/1967 | Wetmore | 174/127 |
| 3,891,790 | A | * | 6/1975 | Kierstead | 174/93 |
| 5,333,914 | A |   | 8/1994 | Oomori et al. | |
| 6,455,779 | B1 | * | 9/2002 | Jones | 174/93 |

FOREIGN PATENT DOCUMENTS

DE 26 37 058 2/1978

(Continued)

OTHER PUBLICATIONS

German Office Action dated Feb. 17, 2006 issued in corresponding application No. 10 2005 029 554.1.

*Primary Examiner*—Chau N Nguyen
(74) *Attorney, Agent, or Firm*—Cohen Pontani Lieberman & Pavane LLP

(57) ABSTRACT

The invention relates to an electrical device (1), especially for a motor vehicle. Said device comprises an electrical component (2) and a connecting cable (5) which is connected to the component (2) and is surrounded by a sheathing (8), the end (9) of said sheathing being at a distance from the component (2). The sheath end (9) and the respectively connected regions (13, 14) of the sheathing (8) and the connecting cable (5) comprise a sealing coating (16). The aim of the invention is to improve the sealing and to increase the durability thereof. To this end, another section (10) of the sheathing (8), embodied in a sleeve-shaped manner, is arranged between the sheath end (9) and the component (2), and the coating (16) extends over a sleeve end (11) facing the sheath end (9) and over the region (17) of the sleeve-shaped section (10) of the sheathing (8) connected thereto. The invention also relates to a method for producing one such device.

7 Claims, 2 Drawing Sheets

FOREIGN PATENT DOCUMENTS

| | | |
|---|---|---|
| DE | 33 04 145 | 8/1984 |
| DE | 195 30 422 | 2/1997 |
| DE | 198 21 657 | 12/1999 |
| EP | 1 339 148 | 8/2003 |
| WO | WO 92/09089 | 5/1992 |

* cited by examiner

ELECTRICAL DEVICE COMPRISING A CONNECTING CABLE AND METHOD FOR PRODUCING SAID DEVICE

CROSS REFERENCE TO RELATED APPLICATIONS

This is a U.S. national stage of application No. PCT/EP2006/063124, filed on 13 Jun. 2006. Priority is claimed on German application no. 10 2005 029 554.1, filed: 23 Jun. 2005, the content of which is a incorporated here by reference.

BACKGROUND OF THE INVENTION

1. Field of the Invention

The invention relates to an electrical apparatus, in particular for a motor vehicle, having an electrical component and having a connecting cable which is connected to the component and has a sheath, with the sheath ending with a sheath end at a distance from the component and with the sheath end and that area of the sheath and of the connecting cable which is in each case adjacent thereto having a sealing covering. The invention furthermore relates to a method for production of such an apparatus.

2. Description of the Prior Art

An abovementioned apparatus and an abovementioned method are known for a plug shell with a multicore connecting cable, which has an outer sheath. The outer sheath of the connecting cable in this case does not extend to the plug shell, but the outer sheath ends at a distance from the plug shell, such that the cores of the connecting cable are exposed between the sheath end of the outer sheath and the plug shell. In order to seal the connecting cable, a shrink sleeve in the form of a covering is shrunk onto the sheath end and to those areas of the outer sheath and connecting cable adjacent thereto. In this known apparatus, the sealing effect of the shrink sleeve undesirably decreases over the course of time and when subjected to external temperature influences.

SUMMARY OF THE INVENTION

One object of the invention is to provide an electrical apparatus of the type mentioned initially in which the sealing of the connecting cable has a longer life. A further object of the invention is to specify a method for production of an apparatus such as this having a longer seal life.

According to the invention, the first-mentioned object is achieved in that, in the case of an electrical apparatus of the type mentioned initially, a further section, in the form of a sleeve, of the sheath is arranged between the sheath end and the component, and in that the covering extends over a sleeve end facing the sheath end and that area of the section, in the form of a sleeve, of the sheath which is adjacent thereto.

The apparatus according to the invention therefore has, between the sheath end of the sheath and the electrical component and starting from the sheath end, first of all a section of the connecting cable without any sheath, then a further section of the sheath which forms a sleeve, followed once again by a section of the connecting cable without any sheath. As a result of the last-mentioned section of the connecting cable without any sheath, the connecting cable is advantageously connected flexibly to the electrical component, such that the latter can be arranged and/or installed, for example in a motor vehicle, freely—for example even in confined spatial conditions. The arrangement of the covering according to the invention advantageously means that, even under the influence of environmental temperatures in which any movement, for example shrinking, of the covering could take place, the arrangement of the covering on a section of the connecting cable without any sheath and sections or areas of the sheath which are adjacent thereto results in the sheath end not moving. The sheath end and the section, in the form of a sleeve, of the sheath remain in their respective position on the connecting cable. Even if the environmental temperatures rise, the connecting cable is sealed in a fixed position, reliably preventing the sheath from moving in the direction of the electrical component, by means of the invention. This ensures reliable, long-term sealing. In contrast, the covering in the case of the apparatus according to the invention would push the sheath end back in the event of an increase in the environmental temperature, thus resulting in a deterioration in the sealing effect. The apparatus according to the invention can be produced very easily and at low cost and provides very good, long-term sealing, for example against the ingress of dirt and/or moisture, thus making it particularly suitable for motor vehicles. The covering is preferably formed integrally, for particularly good sealing. The covering is preferably elastic.

According to one advantageous embodiment of the invention, the covering extends over a sleeve end, facing away from the sheath end, of the section, in the form of a sleeve, of the sheath, and that area of the connecting cable which is adjacent thereto. This results in a further improvement to the sealing of the connecting cable, and all of the sheath ends are advantageously covered by the covering.

It would be feasible, for example, for the covering to be a dip-covering. On the other hand, the covering is particularly cost-effective with good operational reliability and a long life at the same time if, according to another advantageous development of the invention, the covering is a shrink sleeve.

The sealing effect of the covering is advantageously improved further if, according to another embodiment of the invention, an adhesive is arranged between the covering and the sheath of the connecting cable, and between the covering and the connecting cable itself. The adhesive offers the further advantage that it can flow into gaps, thus additionally improving the sealing. The use of a shrink sleeve with an adhesive coating on its inner wall is preferably envisaged.

According to another advantageous embodiment of the invention, the component has an electrical plug element with a plug connection. A refinement such as this has the highly advantageous effect that, on the one hand, the connecting cable has no sheath in an area directly adjacent to the plug element thus allowing the plug element to be connected, for example to a plug, with high flexibility, in particular with the capability to be bent easily, even in confined spatial conditions during installation of the electrical apparatus, and that, on the other hand, this reliably ensures secure sealing of the connecting cable, in particular on the plug connection side, and thus at a point which is at particular risk of the ingress of moisture and/or dirt.

The invention is particularly advantageous when, according to another advantageous embodiment of the invention, the connecting cable has at least one first individual core and one second individual core. In the case of a multi core connecting cable such as this, it was virtually impossible according to the prior art to ensure good sealing without considerable additional effort. The invention allows the connecting cable to be reliably sealed, for example, even when the connecting cable has a cross section other than a simple circular shape, because of its plurality of cores.

It is particularly advantageous if, according to another advantageous embodiment of the invention, the connecting cable is connected to a sensor at an end facing away from the component. The sensor may preferably be a motor vehicle sensor and, for example, a temperature sensor or a rotation-speed sensor, in particular an inductive transmitter. These sensors are normally used in an environment in which they are subject to damaging environmental influences, so that good sealing, as is achieved by the invention, is a major advantage.

The second object mentioned above is achieved according to the invention in that, in the case of a method of the type mentioned initially, the sheath is cut into circumferentially, forming the section, in the form of a sleeve, of the sheath, at a distance from an end area, facing the electrical component of the sheath, in that the section in the form of a sleeve of the sheath is pulled free in the direction of the component, in that the shrink sleeve is drawn over the drawn-free area of the connecting cable and that area of the sheath and of the section, in the form of a sleeve, of the sheath which is in each case adjacent to the drawn-free area, and in that the shrink sleeve is shrunk under the influence of heat onto the connecting cable and the sheath, forming the covering.

This method makes it possible to produce an apparatus according to the invention in an advantageously simple and cost-effective manner; the production process can advantageously be based on integral sheathing of the connecting cable, with the section, in the form of a sleeve, of the sheath being produced without major effort simply by cutting into the sheath, and with a gap being formed in the sheath by pulling the section in the form of a sleeve free, between a part of the sheath which remains at the original location and a section, in the form of a sleeve, of the sheath which is drawn free. A piece of the connecting cable which has been drawn free and is free of sheathing is located in the area of the abovementioned gap, with the shrink sleeve being shrunk directly onto the connecting cable there. During the shrinkage process, the shrink sleeve merges with the sheath and with the connecting cable without any sheath, and in the process follows any changes in the cross section from the sheath to the connecting cable.

According to one advantageous embodiment of the invention, before being shrunk onto the connecting cable and the sheath, the shrink sleeve is drawn over that area of the sheath which is adjacent to the drawn-free area of the connecting cable, the drawn-free area of the connecting cable, the section, in the form of a sleeve, of the sheath, and that area of the connecting cable which is adjacent to the section in the form of a sleeve and faces the electrical component, such that an apparatus according to the invention with additionally improved sealing can also be produced in a simple manner.

BRIEF DESCRIPTION OF THE DRAWINGS

Exemplary embodiments of the invention will be described in more detail in the following text and are illustrated in the drawing, in which.

DETAILED DESCRIPTION OF THE PREFERRED EMBODIMENTS

Figure 1:
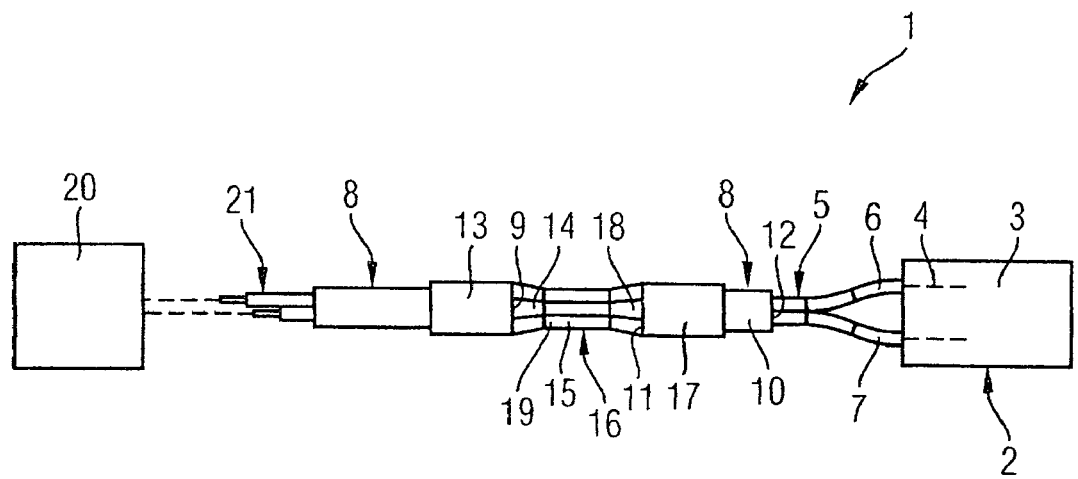
FIG. 1 is a side view of a first electrical apparatus with a connecting cable and a covering.

With respectively corresponding elements being provided with the same reference symbols in the subsequent figures, FIG. 1 shows a plan view of an electrical apparatus 1 having an electrical component 2. The electrical component 2 has an electrical plug element 3, which is in the form of a plug shell and has two plug connections 4. By way of example, the plug element 3 can be used to connect the electrical apparatus 1 to a cable harness in a motor vehicle.

Furthermore, the electrical apparatus 1 has a multi core connecting cable 5 with a first individual core 6 and a second individual core 7. One of the individual cores 6, 7 is in each case connected to one of the plug connections 4. The individual cores 6, 7 essentially rest on one another over the length of the connecting cable 5, and, for example, they may also be connected to one another, with the individual cores 6, 7 being spread apart from one another immediately in front of the electrical component 2, in order to reach the plug connections 4.

The connecting cable 5 also has a sheath 8, which ends with a sheath end 9 at a distance from the component 2. A further section 10 of the sheath 8 is arranged between the sheath end 9 and the component 2, and is in the form of a sleeve. The section 10, in the form of a sleeve, of the sheath 8 has a first sleeve end 11, facing the sheath end 9 of the sheath 8, and a second sleeve end 12, facing away from the sheath end 9. The second sleeve end 12 directly faces the component 2 at the other end.

The sheath end 9 and that area 13 of the sheath 8 which is adjacent to it on one side as well as the area 14 of the connecting cable 5 which has no sheath and is adjacent thereto on the other side have a sealing covering 16 in the form of a shrink sleeve 15. Furthermore, this covering 16 extends over the sleeve end 11, facing the sheath end 9, of the section 10, in the form of a sleeve, of the sheath 8 and the area 17 of the section 10, in the form of a sleeve, of the sheath 8 which is adjacent thereto. The covering 16 is formed integrally and has no interruption so that, in consequence, that area 18 of the connecting cable 5 which has no sheath and is adjacent on the other side to the sleeve end 11, facing the sheath end 9, of the section 10, in the form of a sleeve, of the sheath 8 is also surrounded by the covering 16.

In order to improve the connection between the covering 16 and the connecting cable 5 and its sheath 8, an adhesive 19 is arranged on the inside of the covering 16, to be precise both between the covering 16 and the sheath 8 of the connecting cable 5, and between the covering 16 and the connecting cable 5 itself.

The electrical apparatus 1 also has a sensor 20, preferably for a motor vehicle, with the connecting cable 5 being connected to the sensor 20 at an end 21 facing away from the component 2.

Figure 2:
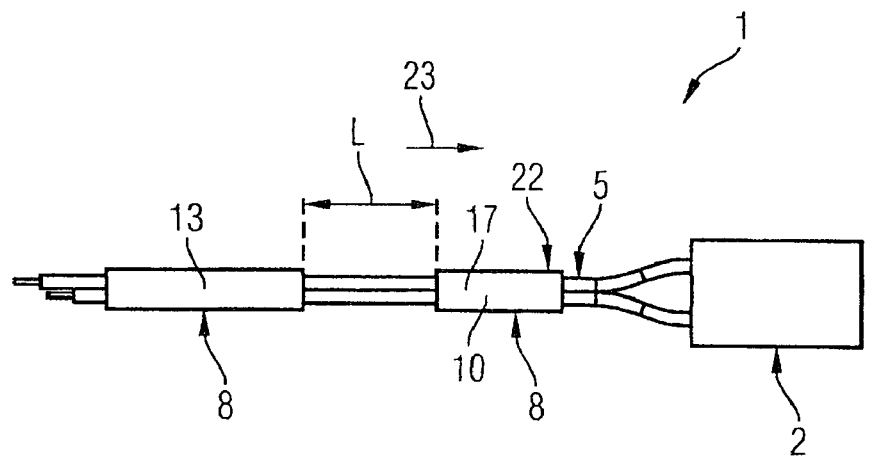
FIG. 2 shows a part of the apparatus shown in FIG. 1, without any covering.

In order to illustrate, in particular, a method for production of the electrical apparatus 1 as shown in FIG. 1, FIG. 2 shows a plan view of the apparatus 1 without a covering. In a first step, the sheath 8 on the connecting cable 5 was cut into circumferentially, forming the section 10, in the form of a sleeve, of the sheath 8, to be precise at a distance from an end area 22 of the sheath 8 facing the electrical component 2.

The section 10, in the form of a sleeve, of the sheath 8 was then drawn free in the direction of the component 2; this direction for drawing it free is symbolized by an arrow 23. The drawing-free process results in a length L of the connecting cable 5, over which length L the connecting cable 5 is not provided with the sheath 8; the individual cores 6, 7 of the connecting cable 5 are also exposed over this length L.

The covering formed by the shrink sleeve is then drawn over the drawn-free area of the connecting cable 5 and that area 13 of the sheath 8 which is adjacent to the drawn-free area of the length L on the one side, and the adjacent area 17 of the section 10, in the form of a sleeve, of the sheath 8 on the other side. The shrink sleeve is then shrunk, by exposure to heat, onto the connecting cable 5, that is to say, in detail, both onto the areas of the connecting cable 5 which have the sheath 8 and those over which the shrink sleeve has been drawn, as well as onto those areas of the connecting cable 5 which have no sheath and are covered by the shrink sleeve, thus resulting in the apparatus 1 having the covering 16 in its final form, as shown in FIG. 1.

Figure 3:
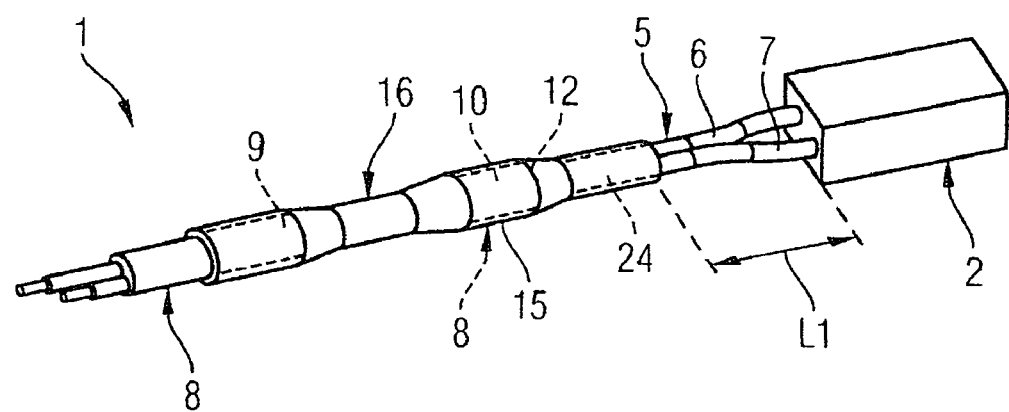
FIG. 3 is a perspective view of a second electrical apparatus having a connecting cable and a covering.
Figure 4:
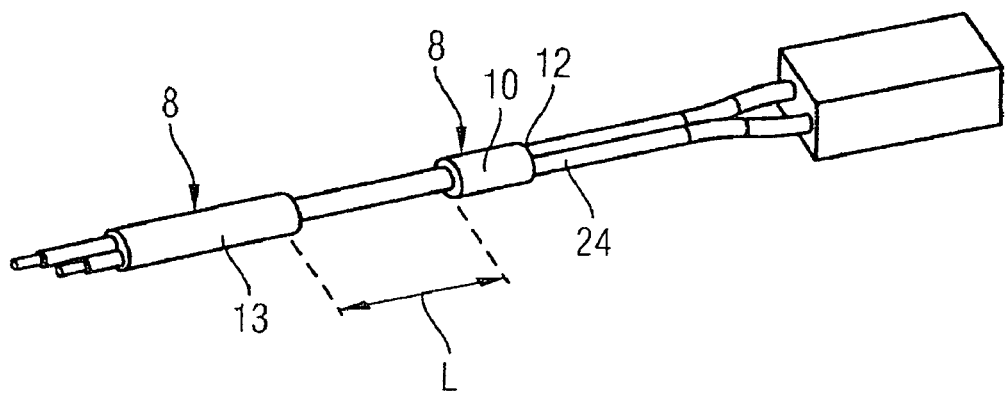
FIG. 4 shows an apparatus as shown in FIG. 3, without any covering.

A further electrical apparatus 1 having a connecting cable 5 and a covering 16 is shown in the form of a perspective view in FIG. 3, and FIG. 4 shows a perspective view of this apparatus 1 without a covering, as a further illustration.

According to this exemplary embodiment, the apparatus 1 is similar to that shown in FIG. 1, but with the difference that, in this case, the covering 16 extends over a sleeve end 12, facing away from a sheath end 9 of a sheath 8 of the connecting cable 5, of a section 10, in the form of a sleeve, of the sheath 8, and a section 24 (see also FIG. 4) of the connecting cable 5 which is adjacent thereto, that is to say further towards an electrical component 2, beyond the section 10, in the form of a sleeve, of the sheath 8. The covering 16 does not extend as far as the component 2, but a length L1 of the connecting cable 5 remains between the covering 16 and the component 2, over which length L1 individual cores 6, 7 of the connecting cable 5 are exposed. Within this length L1, the individual cores 6, 7 are spread apart from one another, for connection to the component 2.

A method for production of an apparatus as shown in FIG. 3 differs from the method described for the apparatus as shown in FIG. 1 in that, before being shrunk on to the connecting cable 5 and the sheath 8, thus forming the covering 16, a shrink sleeve 15 is drawn over an area 13 of the sheath 8 adjacent to a drawn-free area of a length L of the connecting cable 5, the abovementioned drawn-free area of the connecting cable 5, the section 10, in the form of a sleeve, of the sheath 8 and that area 24 of the connecting cable 5 which is adjacent to the section 10 in the form of a sleeve and faces the electrical component 2.

What is claimed is:

1. An electrical apparatus for a motor vehicle, comprising:
   an electrical component;
   a connecting cable connected to said electrical component;
   a sheath having first and second sheath sections arranged on said connecting cable, said first sheath section ending at a sheath end arranged at a distance from said electrical component, said second sheath section comprising a sleeve arranged on said connecting cable between said sheath end of said first sheath section and said electrical component such that a section of said connecting cable between said first and second sheath sections and another section of said connecting cable between said second sheath section and said electrical component is not covered by said sheath; and
   a sealing covering extending from the first sheath section over a sleeve end of said second sheath section and over a portion of said second sheath section adjacent to said sleeve end such that said sealing covering covers said section of said connecting cable between said first and second sheath sections, and said sealing covering extends over said second sheath section and at least a portion of said section of said connecting cable between said second sheath section and said electrical component.

2. The electrical apparatus of claim 1, wherein said sealing covering is a shrink sleeve.

3. The electrical apparatus of claim 1, further comprising an adhesive arranged between said sealing covering and said sheath, and between said sealing covering and said connecting cable.

4. The electrical apparatus of claim 1, wherein said electrical component has an electrical plug element with a plug connection.

5. The electrical apparatus of claim 1, wherein said connecting cable is a multiconductor cable including at least first and second conductors.

6. The electrical apparatus of claim 1, further comprising a sensor, wherein an end of said connecting cable facing away from said electrical component is connected to said sensor.

7. A method for producing of an electrical apparatus as claimed in one of the preceding claims, said method comprising the steps of:
   cutting a sheath circumferentially forming first and second sheath sections, the sheath being arranged on a connecting cable connected to an electrical component, the second sheath section being in the form of a sleeve;
   pulling the second sheath section free toward the electrical component so that the second sheath section is arranged at a distance from an end area of the first sheath section and facing the electrical component, whereby a section of the connecting cable between the first and second sheath sections is not covered by the sheath;
   drawing a shrink sleeve over the sheath so that the shrink sleeve extends from the first sheath section to the second sheath section and covers the section of the connecting cable, between the first and second sheath sections, and so that the shrink sleeve is drawn over the second sheath sections and over at least a portion of the section of the connecting cable between the second sheath section and the electrical component; and
   shrinking the shrink sleeve under the influence of heat onto the connecting cable and the sheath, thereby forming a sealing covering.

* * * * *